United States Patent
Marsh

[15] 3,669,075
[45] June 13, 1972

[54] AUTOMATIC EGG TURNER FOR INCUBATOR

[72] Inventor: Albert F. Marsh, 14232 Brookhurst, Garden Grove, Calif. 92640

[22] Filed: Dec. 17, 1970

[21] Appl. No.: 99,161

[52] U.S. Cl. ................................................................. 119/44
[51] Int. Cl. ..................................................... A01k 41/06
[58] Field of Search .................................. 119/44, 37, 42

[56] References Cited

UNITED STATES PATENTS

| | | |
|---|---|---|
| 962,594 | 6/1910 | Sherman ................................ 119/42 |
| 1,976,159 | 10/1934 | Bridge ..................................... 119/44 |

Primary Examiner—Hugh R. Chamblee
Attorney—Noel G. Conway

[57] ABSTRACT

An incubator egg turner having a drive motor which drives an output shaft having a cam thereon which moves a first single pole double throw switch between a first position when the cam is in one 180° portion of its rotation and a second position when the cam is in the other 180° of rotation, a timer motor which drives a cam which moves a second switch to alternately connect said drive motor to electrical power through said first switch to rotate said output shaft 180° at a time, and there being provided on said output shaft a crank arm which is connected to the egg grid of an incubator to move said grid from one position to another each time the output shaft is rotated 180°, and including a test circuit which can selectively connect electrical power to the drive motor no matter what is the position of said first mentioned cam, and anchor rods rigidly connected to the turner by which the turner can be removably anchored to the incubator.

10 Claims, 7 Drawing Figures

PATENTED JUN 13 1972  3,669,075

INVENTOR.
ALBERT F. MARSH
BY
Noel G. Conway
ATTORNEY

AUTOMATIC EGG TURNER FOR INCUBATOR

This invention relates to egg turners for incubators, and more particularly to such turners which will automatically move an egg grid in an incubator between two positions at regular intervals during the incubation period.

When eggs are being incubated, they should be turned 180° at regular intervals in order to facilitate proper incubation process. In modern incubators, the eggs are placed in an egg grid within the incubator. The egg grid may be, for example, a series of spaced wires which will receive the eggs therebetween, with provision for allowing the eggs to rest on, a support, e.g., a screen spaced just below the grid. With this arrangement, movement of the egg grid will cause the eggs to be turned by being rolled first in one direction, and then in the other direction. By way of example, reference is made to may U.S. Pat. No. 3,543,726 which discloses a circular incubator having such an egg grid therein which will turn all of the eggs within the incubator at the same time.

Incubators having such an egg grid save a great amount of time of the operator. On the other hand, the operator must be certain that he does not forget to turn the eggs--even though the operation takes only a brief instant. Further, it is desirable that the eggs remain in each position for the same amount of time.

One aspect of the present invention is that it provides a compact, simple and reliable turner having a timer therein which will move the egg grid the proper amount at the proper times.

Another aspect of the present invention is that embodiments thereof are particularly well suited for connection to my incubator disclosed in U.S. Pat. No. 3,543,726, and yet, the turner can be attached to standard incubators with little modification.

Still another aspect of my invention is that the turner has a self contained electrical outlet for receiving the plug of the incubator. Therefore, there need not be an extra wire leading to a wall outlet. Rather, there is only the wire leading from the turner to the wall plug. Then, the incubator's power cord is plugged directly into the turner.

Still another aspect of the present invention is that it includes a test circuit which is particularly useful when initially setting up the turner with the incubator. This facilitates the initial installation of the turner into combination with an incubator. Further, the test circuit provides an easily operated means to allow the operator to check to make sure that the turner is operating properly.

With the foregoing in mind, it is a major object of this invention to provide an improved automatic turner for incubators.

Another object of this invention is to provide an incubator turner which is particularly well suited for connected to a circular incubator.

A further object of this invention is to provide a compact reliable incubator turner which can be economically manufactured, and which needs little maintenance.

A still further object of this invention is to provide an automatic incubator turner with a self contained electrical outlet for receiving the plug of the power cord of the incubator.

It is still another object of this invention to provide an incubator turner having a test circuit therein which the operator can use to facilitate initial installation of the turner into combination with the incubator.

It is a still further object of this invention to provide an automatic incubator turner wherein there is provision for an easy adjustment of the length of the output stroke of the turner, whereby the turner can accommodate a wide range of variations in egg sizes and incubator arrangements.

Other and further objects of this invention will become apparent in the detailed description below in connection with the attached drawings wherein.

Figure 1:
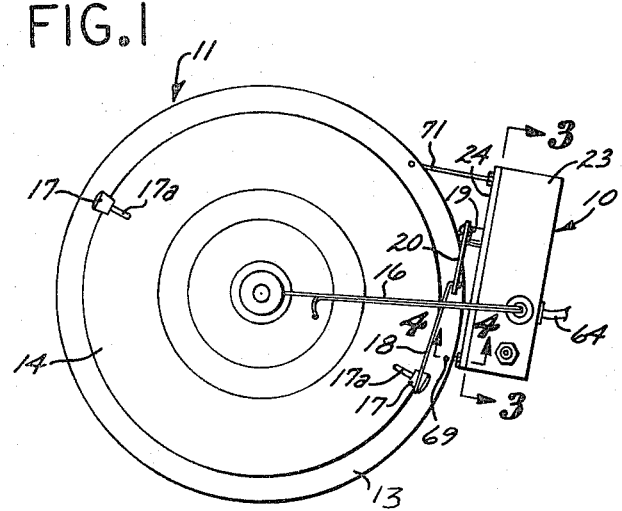
FIG. 1 is a plan view of a first preferred embodiment of the present invention in combination with a circular incubator.

Referring now to FIGS. 1 through 4, the first preferred embodiment of the present invention will be described in detail. In FIG. 1, there is shown an automatic turner, indicated generally by the arrow 10, in combination with a circular incubator, indicated generally by the arrow 11. The incubator 11 is of the type disclosed in my U.S. Pat. No. 3,543,726, and includes a circular bottom having an annular flange 13 around its periphery with a circular cover 14 thereover. Power is fed into the incubator 11 through a wire 16. And, as described in more detail in the above mentioned patent, there is an egg grid within the incubator which functions to rotate the eggs as the cover 14 is rotated (as seen in FIG. 1) counterclockwise and then clockwise. Without the turner 10, this rotation is accomplished by the individual grasping handles 17 and applying the rotational forces.

In the incubator shown in my said U.S. Pat. No. 3,543,726, U.S. No. bolts 17a which secure the handles 17 to the cover 14 are received in a recess in the upper edge of a carrier ring which carries the egg grid. And, that recess is rather wide in order to facilitate indexing of the bolts for the handle 17. Preferably, the width of that recess is reduced when the incubator 11 is to be used with an automatic turner 10. This will reduce the amount of movement that it is necessary to impart to the handle 17 in order to accomplish the egg rotating function.

With the turner 10, there is a connecting rod 18 removably secured to one of the handles 17, which applies the rotational forces alternately in the counterclockwise and clockwise directions as seen in FIG. 1. The connecting rod 18 applies these forces by intermittent rotation of output shaft 19 of the turner 10, which output shaft has a crank arm 20 thereon which is adjustably held in its desired position relative to the crank shaft by means of a flathead screw 21. As seen best in FIG. 2, there are a series of holes 22 provided in the crank arm 20. Therefore, the amount of movement imparted to the handle 17 with each 180° rotation of the output shaft 19 can be varied between a minimum amount (in the case that the connecting rod 18 were inserted in the hole nearest the output shaft) and the maximum amount (in the case that the connecting rod were inserted in the hole 22 at the extreme end of the crank arm).

The connecting rod 18 is formed with a U-shaped hooked portion at the end which is connected to the handle 17. Thereby, the connecting rod 18 can be connected to the handle by merely forcing it down over the handle 17 (into the paper as seen in FIG. 1), or lifted upwardly in order to remove it from the handle.

Figure 2:
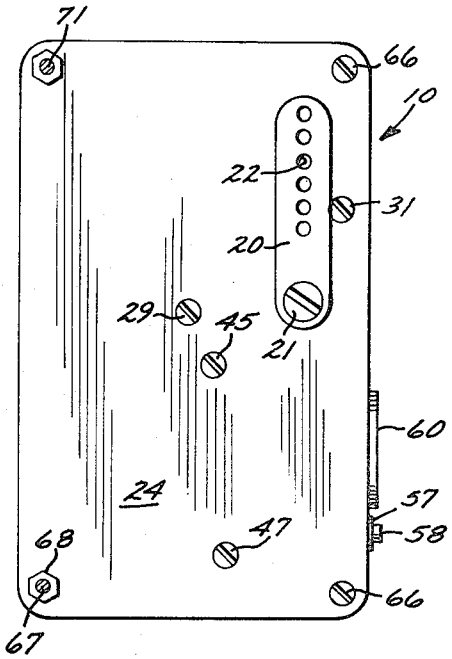
FIG. 2 is a front elevation view of the automatic turner disclosed in FIG. 1.
Figure 3:
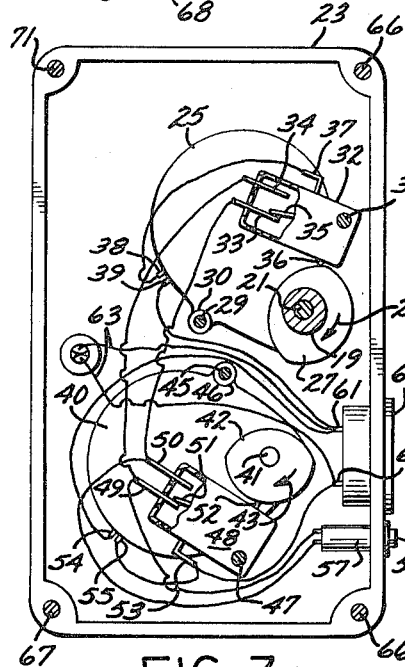
FIG. 3 is an elevational cross sectional view of the automatic turner, taken along line 3—3 in FIG. 1.

Referring now to FIGS. 2 and 3 in more detail, the turner 10 includes a housing 23 having a cover plate 24 thereon which are preferably made of some suitable material such as, e.g., plastic. In FIG. 3, it can be seen that there is a drive motor assembly 25 therein which drives output shaft 19 at a speed of, preferably, 1 revolution per minute in the direction illustrated by arrow 26 when actuated. The output shaft 19 has fixed thereto a cam 27 which cooperates with other components to be described in the selective actuation of the drive motor assembly 25.

The drive motor assembly 25 is mounted on the cover plate 24 by means of a bolt 29, having a spacer 30 therearound, which bolt is received through the cover plate and through an attachment hole in the drive motor assembly. The drive motor assembly 25 is also attached to the cover plate 24 by means of a bolt 31, which extends through an attachment hole in the drive motor assembly and a hole in miniature snap switch 32 and a nut (not shown). The thickness of the snap switch 32, is the same as the length of the spacer 30, and accomplishes the spacing function to permit clearance for the cam 27. Although there is only one bolt 31 through the switch 32, the switch is held in place by virtue of being compressed between the drive motor assembly 25 and the cover plate 24 by a nut (not shown). If preferred, a star washer (not shown) can be provided around the bolt 31, between the switch 32 and the cover plate 24.

The switch 32 is a single pole double throw snap switch, and has a first contact 33 and a second contact 34 which are alternately engaged by switch member 35 in response to movement of plunger, or follower, 36, which is spring loaded to follow the cam 27. The switch arm 35 is electrically connected to switch terminal 37. With the cam 27 in the position shown, the plunger 36 is in its downward position (as seen in FIG. 3) and the switch member 35 is in engagement with the first contact 33. After the cam 27 has rotated 180°, the plunger 36 will be moved upwardly (as seen in FIG. 3) and the switch arm 35 will snap over to contact the second contact 34. As switches like switch 32 are commercially available, the remainder of the interior of the switch is not disclosed.

The drive motor assembly 25 is provided with a first terminal 38 and a second terminal 39, which are connected to a drive motor within the assembly so that said motor will turn whenever electrical power is applied to both of said last mentioned terminals.

Within the housing 23, there is also provided a timer motor assembly 40, having a rotary shaft 41 on which is mounted a cam 42. When the timer motor assembly 40 is energized, it slowly rotates the shaft 41, and therefore, the cam 42, in the direction indicated by arrow 43 at, preferably, 1 revolution every 120 minutes.

The timer motor assembly 40 is also attached to the cover plate 24 the same as the drive motor assembly 25. More particularly, a bolt 45 extends through the cover plate 24 and a spacer 46, and then appropriate attachment hole in the time motor assembly 40. And, a bolt 47 extends through the cover plate 24 and miniature switch 48 and an attachment hold in the timer motor assembly 40. Then, by use of nuts (not shown) the timer motor assembly 40 can be secured to the cover plate 24 with the switch 48 and the spacer 46 spacing the timer motor assembly away from the cover plate sufficiently to allow clearance for the cam 42. As in the case of the switch 32, a star washer can be provided around the bolt 47 between the switch 48 and the cover plate 24; however, the frictional forces between the timer motor assembly 40 and the cover plate 24 are normally sufficient to hold the switch 48 in position.

The switch 48 has a first contact 49 and a second contact 50 which are alternately engaged by switch arm 51 in response to movement of plunger, or follower, 52. The plunger 52 is spring loaded to follow the cam 42. And, while the cam 42 is in the 180° of turning arc on the bottom in FIG. 3, the switch arm 51 will remain in contact with the first contact 49. Then, when the cam 42 rotates to the other 180° portion of the cam (the part on top as seen in FIG. 3) the plunger 52 will extend upwardly (as seen in FIG. 3) and the switch arm 51 will snap over to contact the second contact 50. With the cam 42 in the position shown in FIG. 3, the shaft 41 will have to rotate approximately 100° before this switching action would take place.

Within the switch 48, switch terminal 53 is in continuous electrical contact with the switch arm 51.

The timer motor assembly 40 has a first terminal 54 and a second terminal 55 which are connected to a motor (not shown) within the assembly, which motor rotates when electrical power is supplied to said just mentioned first and second terminals.

When initially installing the turner 10 in combination with an incubator, it is desired that there be some means of rotating the crank arm 20 as desired. Thereby, the apparatus can be tested in order to assure that there will be the proper movement of the egg grid. To this end, there is provide a test circuit including a normally open switch 57 which may be temporarily closed by pushing on push button 58. As can be seen, the two contacts of the normally open switch 57 are connected to first and second contacts 50 of the switch 48. Thereby, the switch 48 can be shunted out of the circuit when the push button 58 is depressed. The manner in which the test circuit operates will be described in further detail below.

The automatic turner 10 is preferably to be used with an incubator using electrical power to heat itself. Therefore—in order to eliminate an extra cord leading to a wall socket—the turner 10 is provided with a built-in female receptacle 60 having a first terminal 61 and a second terminal 62 which are connected to two wires 63 of power cord 64. Thereby, there is continuously electrical power at the terminals 61 and 62 whenever the power cord 64 is plugged into a wall socket, or other energized socket.

Figure 4:
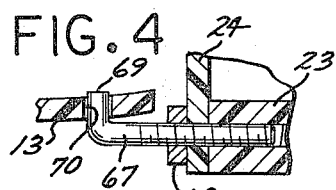
FIG. 4 is an enlarged fragmentary cross sectional view of the turner in FIG. 1 taken along line 4—4 in FIG. 1.

Before going on to the manner of connecting the various components within the housing 23, and the operation thereof, the turner 10 will be described further. The cover plate 24 is anchored to the housing 23 at the top edge thereof (the right side as seen in FIGS. 2 and 3) by a pair of bolts 66 which pass through the cover plate and thread into suitable threaded holes in the housing 23. Along the bottom edge of the turner 10, different structure is provided. Referring now to FIGS. 1, 2, and 4 in particular, there is provided a first anchor rod 67 having a threaded portion which passes through the cover plate 24 and is threaded into a suitable threaded hole in the housing 23. A nut 68 serves to lock the cover plate 24 against the housing 23. At the free end of the anchor rod 67, there is provided an upstanding finger portion 69 which extends at a right angle to the main portion of the anchor rod. This upstanding finger portion 69 is received through a suitable hole 70 in the flange 13 of the incubator 11. Thereby, the automatic turner 10 can be anchored to the incubator 11 at the point of the anchor rod 67. A second anchor rod 71 is provided at the other lower corner of the turner 10 (the upper lefthand corner as seen in FIG. 2 and 3), and functions to attach the turner to the flange 13 at a second point in the same manner that the first anchor rod 67 attaches the turner to the incubator.

It can be seen that this means of attaching the turner 10 to the incubator 11 has the advantage that it is simple and reliable. And, the turner can be quickly connected or disconnected to the incubator 11. Further, previously sold incubators 11, (which do not have holes such as holes 70 in the flange 13) can be easily adapted to receive the turner 10 by merely forming two holes like hole 70 to receive the anchor rods 67 and 71. This can be done with a heated nail since the flange is made of plastic.

In FIG. 3, it can be seen that the second terminal 62 is connected directly to the switch terminal 53 of the switch 48 (and therefore, directly to the second terminal 55 of the timer motor assembly 40). And, the first terminal 61 is directly connected to first terminal 54 of the timer motor assembly 40. Therefore, the timer motor assembly 40 will turn continuously so long as the power cord 64 is plugged in.

Also, second terminal 39 of the drive motor assembly 25 is connected directly to the first terminal 61 of the receptacle 60. However, the motor within the assembly 25 will only operate whenever first terminal 38 thereof is electrically connected to the second terminal 62 of the receptacle 60 (assuming that the power cord 64 is plugged in), and that connection must be made through the switches 32 and 48 (assuming that switch 57 is not in its closed position). More particularly, the first terminal 38 is directly connected to the terminal 37 of the switch 32 (through switch arm 35) to either the first contact 33 or the second contact 34 of the switch. The first contact 33 is connected to the second contact 50 of the switch 48, while the second contact 34 of the switch 32 is connected to the first contact 49 of the switch 48.

From the foregoing, it can be seen that the motor within the drive motor assembly 25 is not operating so long as the switch 48 is in the condition shown. However, when the cam 42 rotates another 100° and the plunger 52 moves to swing the switch arm 51 into contact with the second contact 50, the terminal 38 will be electrically connected to the second terminal 62, and the motor within the drive motor assembly 25 will operate, rotating output shaft 19. After the output shaft 19 has rotated the cam approximately 170°, the shape of the cam will cause the plunger 36 to be moved inwardly (upwardly as seen in FIG. 3) as rotation of the output shaft continues. At the time of rotation of 180°, the plunger 36 has been moved sufficiently that the switch arm 35 will be snapped over to the second contact 34, thus breaking the electrical contact of first terminal 38 and the second terminal 62. This will stop the rotation of the output shaft 19.

With the turner in the just described condition, the timer motor 40 will continue to turn the cam 42 until the cam causes the plunger 52 to move the switch arm 51 back into contact with the first contact 49 of the switch 48 (approximately 180° of rotation of the cam). Then, because the switch arm 35 is in contact with the second contact 34 of the switch 32, the drive motor assembly 25 is energized causing output shaft 19 to rotate the crank arm 20 and the cam 27. When the output shaft 19 is rotated approximately 180°, the cam will reach the condition shown in FIG. 3 where the shape of the cam allows the switch arm 35 to move back into contact with the first contact 33 of the switch 32. This will turn off the drive motor in the drive motor assembly 25.

With the foregoing circuitry, and assuming that the timer motor assembly turns shaft 41 once every 120 minutes, the output shaft 19 is rotated 180° every 60 minutes.

It should be noted that the above described apparatus permits the switches 32 and 48 to be easily adjusted. More particularly, each of the switches 32 and 48 are mounted so that they can be adjustably positioned around a single bolt passing through the case of each respective switch. For example, if the shape of the cam 27 relative to the position of the switch 32, caused the output shaft to rotate, e.g., 183° and then 177°, the switch 32 can be rotated slightly to correct this undesired result. Then, the nut on the bolt 31 is tightened, and the rotation of the output shaft 19 is checked again. With this arrangement, the minute irregularities in the various commercially available switches can be accommodated easily. The adjustment of the switch 48 would be accomplished in the same manner as the adjustment of the switch 32.

Also, it can be seen that mounting the components, e.g., drive motor assembly 25, on the cover plate 24 makes such components very easy to install initially and to repair.

The test circuit is used in the following manner. Firstly, it should be noted that regardless of which position the switch arms 35 and 51 are in, there will be electrical connection between the second terminal 62 and the first terminal 38 when the button 58 of the switch 57 is depressed. More particularly, with the switch arms 35 and 51 in the position shown, and the switch 57 closed, there is electrical connection from the terminal 62 through the switch terminal 53, and thence through the switch 57 to the second contact 50 of the switch 48, and thence through first contact 33 and switch arm 35 of the switch 32, and thence to the terminal 38 through the switch terminal 37.

The automatic turner 10 is initially adjusted in the following manner. Before the connecting rod 18 is attached to the crank arm 22, button 58 is pressed and held down for a little over one-half of a turn of the output shaft 19. Then, the button 58 is released. With the switch arm 51 in the position shown in FIG. 3, the output shaft 19 would continue to turn until it reached the position shown in FIG. 3, when switch arm 35 snaps from contact 34 to contact 33, stopping the output shaft 19. (If the cam 42 were in such position that the switch arm 51 was contacting the second contact 50, the output shaft 19 would automatically stop at a position 180° from that shown in FIG. 3). If the shaft 19 does not continue to turn, the process is repeated to be sure that you are at a stopping point when the crank shaft 19 stops.

After the output shaft 19 comes to rest, the screw 21 is loosened while holding the output shaft with a pair of pliers. Then, the crank arm 20 is moved to a horizontal position (a vertical position when the turner 10 is in the position shown in FIGS. 2 and 3). Then, the screw 21 is tightened to lock the crank arm 20 in that desired position.

Then, the incubator 11 is placed with the upstanding finger portions of the anchor rods 67 and 71 being received through the holes in the flange 13. Then, the connecting rod 18 is clipped onto one of the handles 17 of the incubator 11, and is inserted in an appropriate hole 22 in the crank arm 20. For quail eggs, a hole 22 in the crank arm 20 approximately 1 inch from the center of the output shaft 19 is used. For larger eggs, a hole 22 further away from the output shaft 19 is selected in order to give greater movement to the connecting rod 18 and therefore the handle 17.

Figures 5, 6:
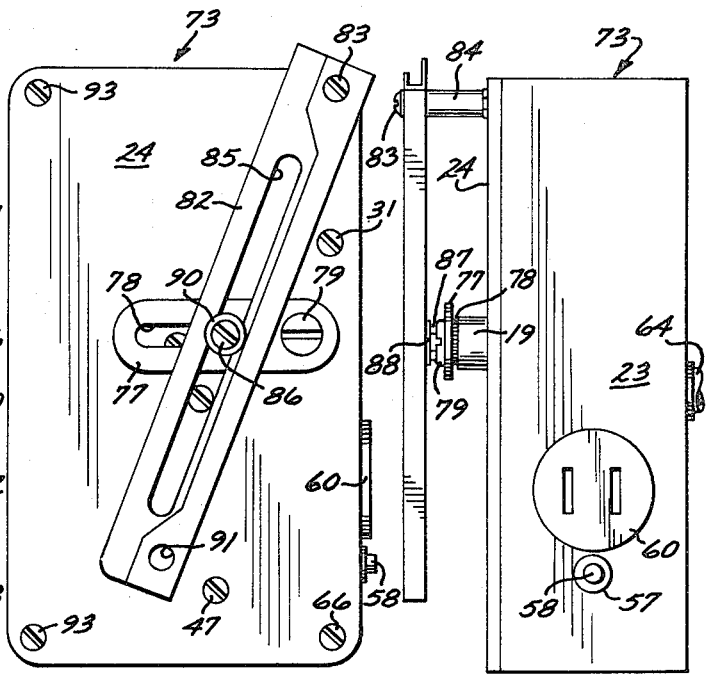
FIG. 5 is an elevational view of a second embodiment of the present invention which is useful with a different type incubator.
FIG. 6 is an elevational view of the second embodiment of the automatic turner as seen from the right side in FIG. 5; and, FIG. 7 is an overall view of the second preferred embodiment of the automatic turner in combination with an incubator.
Figure 7:
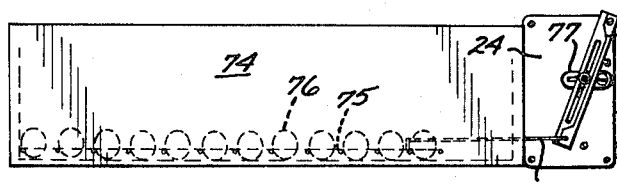

Referring now to FIGS. 5 and 6, a second embodiment of the present invention will now be described. In said FIGS. 5 and 6, there is shown an automatic turner, indicated generally by the arrow 73, which is used in connection with an incubator 74. Said incubator 74 has an egg grid 75 (indicated in dashed lines) therein with a series of eggs 76 (indicated in dashed lines) received in the egg grid. The arrangement of the egg grid 75 is such that if it moved to the right and left (as seen in FIG. 7) the eggs 76 can be caused to rotate in the desired manner.

The turner 73 has the same components inside of it as the turner 10, and therefore, said components are not shown or described in connection with this embodiment of the invention. The parts of the turner 73 which are different than the turner 10 will now be described. As can best be seen in FIGS. 5 and 6, the turner 73 has a crank arm 77 held to the end of output shaft 19 by means of a flathead screw 79. A star washer 78 functions to further insure against relative movement between the crank arm 77 and the output shaft 19. For a purpose to be described, the crank arm 77 has elongated slot 78 therethrough.

The turner 73 also has an oscillating lever 82 which is mounted for swinging movement about bolt 83 received in the upper righthand corner (as seen in FIG. 5) of the housing 23. A spacer sleeve 84 functions to space the lever 82 from the cover plate 24. The lever 82 is also provided with an elongated slot 85 therethrough for a purpose which will now be described.

Connected to the crank arm 77 is a crank pin assembly which comprises a bolt 86 which is adjustably secured to the crank arm by means of a pair of nuts. In FIG. 6, one of the nuts (nut 87 can be seen). There is another nut on the right side of the crank arm 77 (as seen in FIG. 6), however, that nut cannot be seen because of the star washer 78 and the output shaft 19. Washers 88 and 90 function to keep the bolt 86 in the slot 85, and there is a looseness between the washers 88 and 90 to permit the bolt 86 to move freely along the slot 85. With this assembly, as the crank arm 77 is swung 180° from the position shown in FIG. 5, the lever 82 is swung about the bolt 83 from the position shown to a position extending generally downwardly and to the right. This causes the lower end of the lever 82 to be intermittently moved to the right and left as the crank arm 77 is intermittently rotated in 180° steps. At the lower end of the lever 82 there is a hole 91 which receives one end of the connecting rod 92. This connecting rod 92 (which is connected to the egg grid 75) will transfer the intermittent back and forth motion of the lower end of the lever 82 to the egg grid.

It should be particularly noted that the arrangement of the crank pin assembly enables the operator to very finely adjust the amount of movement given to the egg grid 75. More particularly, if the bolt 86 is locked in position on the crank arm 77 at a position slightly further from the output shaft 19 (slightly to the left as seen in FIG. 5), there will be an increased amount of movement of the hole 91 as the crank arm is rotated.

When the automatic turner 77 is initially set up, it is done in the same way as the turner 10. More particularly, with the connecting rod 92 disconnected, the button 58 is depressed for slightly over 180° of rotation of the output shaft 19 and then released. Then, the output shaft 19 will continue to rotate until it stops automatically as previously described. At that time, the flathead bolt 79 is loosened slightly and the crank arm 77 is moved to a horizontal position. Such is shown in FIG. 5. Then, the oscillating lever 82 will automatically stop at each end of its oscillatory motion as is desired to accomplish the egg rolling function.

As anchor rods, like anchor rods 67 and 71 are not used with the automatic turner 73, conventional bolts 93 replace said anchor rods.

The automatic turner 73 is used in the position shown in FIGS. 5 to 7, and is secured to the incubator 74 by means of screws which are not shown.

While only a few embodiments of the present invention have been shown and described in detail, it will be apparent to those skilled in the art that such is by way of illustration only, and numerous changes may be made thereto without departing from the spirit of the present invention. Accordingly, it is my intention that the invention be limited solely by the appended claims.

I claim:

1. An automatic egg turner for an incubator having an egg grid therein with eggs which are turned each time the grid is moved between a first and a second position, said egg turner comprising:
   an output shaft adapted to be operatively connected to said egg grid to move said grid from its first position to its second position each time the output shaft is rotated from a first position to a second position;
   motor means for rotating said output shaft from said first position to said second position;
   first switch means operatively connected to said output shaft and said motor means for turning said motor means off when said output shaft reaches said second position, said switch means being responsive to the position of the egg grid through the position of the output shaft, said switch means having a first and a second position;
   second switch means movable between a first and a second position, said second switch means connecting power to said motor means when said first switch means is in said first position and said second switch means is in said first position and connecting power to said motor means when said first switch means is in said second position and said second switch means is in said second position, but not when one of said switches is in its first position and the other of said switches is in its second position.

2. The turner set forth in claim 1 including:
   test circuit means for selectively connecting power to said motor means no matter which of said two positions said first switch means is in when said test circuit means is closed.

3. The turner set forth in claim 2 wherein said first switch means is connected so that if said test circuit means supplies power to said motor means for a time and then said test circuit means is opened after the output shaft reaches its second position, said first switch means will keep supplying power to said motor means until said output shaft reaches said first position.

4. The turner set forth in claim 1 including:
   means for successively moving said second switch means between said first and second positions at intervals.

5. The turner set forth in claim 1 including:
   a housing surrounding said motor means and said first and second switch means;
   means for connecting power into said housing to said second switch means;
   a female receptacle in said housing adapted to receive a male plug of a cord leading to a heat source in the incubator.

6. The turner set forth in claim 1 wherein said first and second positions of said output shaft are 180° apart and including:
   a crank arm extending at a right angle to said output shaft, said crank arm being adapted to be connected to a connecting rod by which it is connected to said grid.

7. The turner set forth in claim 1 wherein: said first and second positions on said output shaft are 180° apart and including:
   an oscillating lever swingably connected to said housing at a first point on said lever for swinging movement between a first position and a second position, said lever having means at a second point thereon adapted to connect the lever to a connecting rod connected to the egg grid;
   and means connecting said lever to said output shaft for moving said lever between said first and second positions as said output shaft is moved between its first and second position, whereby when said output shaft is moved from its first to its second position said lever will move said egg grid from its first to its second position.

8. The turner set forth in claim 1 wherein said first switch means comprises:
   a single pole double throw switch having a first and a second contact with a switch arm movable between a first position in contact with said first contact and a second position in contact with said second contact;
   a first cam means mounted for rotation with said output shaft, said cam means cooperating with said switch arm to cause said switch arm to be in said first position during the time that said output shaft is moving from said first position to said second position and then causing said switch arm to move to said second position upon said output shaft reaching said second position, said cam means causing said switch arm to remain in said second position while said output shaft is moved from said second position to said first position and then causing said switch arm to move to said first position.

9. The turner set forth in claim 1 wherein said incubator has a hole which opens in a first direction and including:
   means for connecting said turner to said incubator, said last mentioned means including:
   a housing enclosing said switch means;
   an anchor rod rigidly secured to said housing with a free end, said anchor rod having a finger portion at said free end extending at generally a right angle to said rod, said finger portion being received into said hole in said incubator, whereby said turner can be disconnected from said incubator by moving the incubator or turner to a position where said finger portion can be removed from said hole.

10. The turner set forth in claim 9 wherein said incubator has a second hole spaced from said first hole, said second hole facing in a first direction and said last mentioned means includes:
   a second anchor rod rigidly secured to said housing with a free end, said second anchor rod having a finger portion at said free end extending at generally a right angle to said rod, said finger portion being received into said second hole in said incubator.

* * * * *